United States Patent
Fischer

(10) Patent No.: US 11,280,083 B2
(45) Date of Patent: Mar. 22, 2022

(54) SMOKE BARRIER SYSTEM

(71) Applicant: Saint-Gobain Glass France, Courbevoie (FR)

(72) Inventor: Peter Fischer, Belp (CH)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 187 days.

(21) Appl. No.: 16/478,609

(22) PCT Filed: Jan. 18, 2018

(86) PCT No.: PCT/EP2018/051219
§ 371 (c)(1),
(2) Date: Jul. 17, 2019

(87) PCT Pub. No.: WO2018/134309
PCT Pub. Date: Jul. 26, 2018

(65) Prior Publication Data
US 2019/0368192 A1  Dec. 5, 2019

(30) Foreign Application Priority Data
Jan. 19, 2017  (EP) ..................... 17152239

(51) Int. Cl.
*E04B 1/94* (2006.01)
*B32B 17/10* (2006.01)
(Continued)

(52) U.S. Cl.
CPC ........ *E04B 1/946* (2013.01); *B32B 17/10018* (2013.01); *B32B 17/10293* (2013.01);
(Continued)

(58) Field of Classification Search
CPC ... E04B 1/946; E04B 1/944; B32B 17/10311; B32B 2255/205; B32B 7/06; E06B 3/549
See application file for complete search history.

(56) References Cited

U.S. PATENT DOCUMENTS

| 4,075,386 A | 2/1978 | Willdorf |
| 5,811,926 A * | 9/1998 | Novich .................. H01J 9/185 313/243 |

(Continued)

FOREIGN PATENT DOCUMENTS

| EP | 2 050 484 | 4/2009 |
| FR | 2 931 177 | 11/2009 |
| GB | 1 579 848 | 11/1980 |

OTHER PUBLICATIONS

International Preliminary Report on Patentability dated Jul. 23, 2019 (dated Jul. 23, 2019), Application No. PCT/EP2018/051219, 7 pages.

*Primary Examiner* — Gisele D Ford
(74) *Attorney, Agent, or Firm* — Rankin, Hill & Clark LLP

(57) ABSTRACT

A splinter binding and weight bearing foil with an adhesive and a glass pane in a smoke barrier system. The smoke barrier system includes a fixation element. The adhesive is arranged between the splinter binding foil and the glass pane, wherein the splinter binding foil is equipped to hold glass fragments of a glass pane together in case of a glass breakage. The splinter binding foil is arranged between the fixation element and the glass pane, in particular the splinter binding foil is clamped between the fixation element and the glass pane. The splinter binding foil is designed to detach from the glass pane in the case of fire and/or temperature influence.

14 Claims, 1 Drawing Sheet

(51) Int. Cl.
*E04B 9/36* (2006.01)
*E06B 3/54* (2006.01)

(52) U.S. Cl.
CPC .............. *E04B 1/942* (2013.01); *E04B 9/366* (2013.01); *E06B 3/549* (2013.01); *E06B 3/5436* (2013.01); *B32B 2367/00* (2013.01)

(56) References Cited

U.S. PATENT DOCUMENTS

| | | | | |
|---|---|---|---|---|
| 5,983,593 | A | * 11/1999 | Carbary | ................ E06B 3/6715 52/786.11 |
| 2009/0324858 | A1 | * 12/2009 | Jaeger | ................... E06B 3/6617 428/34 |
| 2010/0175347 | A1 | * 7/2010 | Bettger | ................ E06B 3/6612 52/788.1 |
| 2011/0296771 | A1 | * 12/2011 | Miller | ..................... E06B 3/673 52/171.3 |
| 2019/0241769 | A1 | * 8/2019 | Kosaka | ................... B32B 7/022 |

* cited by examiner

SMOKE BARRIER SYSTEM

BACKGROUND OF THE INVENTION

Field of the Invention

The invention relates to the field of fire and/or smoke protection and, more specifically, to a device to protect a person from smoke and/or fire.

Description of Related Art

In the event of a fire in a building, the fire must be prevented from spreading and the persons in the building must be swiftly evacuated. For this purpose, various fire extinguishers and fire alarms are available. Smoke generated by a fire quickly spreads along the ceiling and can reach locations far away from the origin of the fire. On account of this phenomenon even persons who have no need to hurry with evacuation become alarmed and panic. To prevent such a panic, exposed anti-smoke screens have been developed to be hung from the ceilings at intervals. Tests show that these screens can effectively prevent the smoke from spreading along the ceiling. The anti-smoke screens can be built penetrating the ceiling and installing the ceiling member is troublesome and heavy. Anti-smoke screens are, for example, known from the following applications GB1579848 and FR2931177. Wherein GB1579848 discloses a rod-like fastening in between a two plate screen and FR2931177 discloses a vertical sealing between two adjacent glass plates. Standard windows for example with a frame, as shown in U.S. Pat. No. 4,075,386, cannot be viewed as a smoke barrier or anti-smoke screens.

The function of smoke barriers is to control the movement of fire effluent within supporting constructions by forming a barrier. The functions of active or manually deployed smoke barriers are identical to those of static smoke barriers, but they also have the ability to be retracted and concealed when not in use.

Typical functions of smoke barriers are:
- to create a smoke reservoir by containing and limiting the travel of the smoke;
- to channel smoke in a pre-determined direction; and/or
- to prevent or retard smoke entry to another area or void.

As such anti-smoke screens are hanging from the ceiling and these screens can be damaged by bumping an object against the screen. Such a bumping can lead to the breakage of the screen resulting in a falling down of cullet respectively splinter of the screen. Due to the splinter, people beneath the screen can get injured and item below can be damaged by the cullet and/or splinter.

SUMMARY OF THE INVENTION

It is therefore an object of the invention to create an improved device to protect a person from smoke and/or fire and from injuries, and a use of a splinter binding foil with an adhesive and a glass pane in a smoke barrier system. These may overcome the disadvantages of the prior art.

These objects are achieved by the use of a splinter binding foil with an adhesive and a glass pane in a smoke barrier system and a smoke barrier system.

For the use of a splinter binding foil with an adhesive and a glass pane in a smoke barrier system the smoke barrier system includes a fixation element. The adhesive is arranged between the splinter binding foil and the glass pane, wherein the adhesive is a part of the splinter binding foil. Accordingly, the adhesive is arranged next to the glass pane. Furthermore, the splinter binding foil is equipped to hold glass fragments of a glass pane together in case of a glass breakage. The splinter binding foil can be weight bearing. The weight bearing property of the splinter binding foil can promote the holding of the glass fragments, as the weight bearing foil can retain the weight of the fragments and cullet connected respectively attached and/or adhered to the splinter binding foil. The splinter binding foil can include a foil layer and the adhesive.

The splinter binding foil can be arranged between the fixation element and the glass pane. In particular the splinter binding foil can be clamped between the fixation element and the glass pane. Due to the clamping of the splinter binding foil the splinter binding foil can be hold in place and can be prevented from falling down on a person and/or an item. Alternatively to the clamping the splinter binding foil can be reinforced respectively strengthened, in particular in an edge region of the glass pane. The reinforcement can be prevented from falling down on a person and/or an item and to stably connect the splinter binding foil to the pane. The reinforcement can be designed as a thickening of the splinter binding foil in the edge region of the pane.

Furthermore, the splinter binding foil is designed to detach from the glass pane in the case of fire and/or temperature influence of hot air and/or gas. The detachment of the splinter binding foil in the event of a fire or in case of exposure to hot air and/or gas can prevent the splinter binding foil from self-ignition as the foil drops from the smoke screen before accelerating spreading of the fire. The spreading of the fire could be accelerated by ignited droplets of the foil.

The splinter binding foil can detach from the glass pane in the case of fire and/or temperature influence without creating any burning droplets.

Accordingly in case of a fire or spreading of smoke the further spreading of fire can be prevented due to the dropping of the foil. Furthermore, in the cold state people can be protected from injury, like cuttings and piercings. Also damage of items caused by fragments of broken glass can be prevented in the cold state. This allows for a protection in the cold state and in the event of fire, such a device can be called splinter binding smoke barrier system. It is evident to the skilled person, that broken glass pane will be replaced by a non-broken glass pane with an adhered splinter binding foil as described above, once the breakage is recognised.

The term temperature influence respectively thermal influence means that the temperature of the air respectively gas is at least 80° C. or higher. Normal room temperature and slightly elevated summer temperature of approximately 40° C. are not considered as temperature influence.

In contrast to the temperature influence, in the cold state no thermal stress is exerted on the splinter binding foil, the glass pane or the smoke barrier system. In this text the term cold state refers to normal room temperature and slightly elevated summer temperature up to approximately 40° C. As mentioned above the splinter binding foil can prevent the falling down of glass in case of a glass breakage, wherein the cullet respectively glass fragments or shards are adhered to the splinter binding foil. In the cold state the smoke barrier system can be viewed as a safety glass. The splinter binding foil holds the whole glass pane in place in case of breakage and improves the safe usage of a smoke barrier system.

The smoke barrier system can include a framed system as a fixation element, the frame system can include a three sided frame. The frame is essentially open to the lower side of the smoke barrier system. The lower side is directed towards the floor of the building in which the smoke barrier system is installed. Such a framed system can improve the mechanical stability of the smoke barrier system.

The splinter binding foil is not covered by an additional glass pane. In contrast to that, laminated glass includes a intermediate polymer foil element in between two panes. Such intermediate polymer foil element can self-ignite upon exposure to fire and/or temperature influence. Such intermediate polymer foil elements cannot be viewed as splinter binding foil. Intermediate polymer foil elements require an additional cover above the foil respectively on both flat sides of the intermediate polymer foil element as shown for example on EP 2050484. As shown in EP 2050484 the intermediate polymer foil elements are designed as intermediate layer between two glass sheets.

With the present invention it surprisingly becomes possible to use a flammable foil as a splinter binding foil in a smoke barrier system. Thereby the smoke barrier system can combine the advantages of a smoke barrier system in case of a fire and/or hot gases in general with a binding of glass fragments in the cold case. The skilled person would not have used a flammable foil in a smoke barrier system as the spreading of fire and/or hot gas is to be prevented by the smoke barrier system. The usage of such a flammable foil would contradict the doctrine of not using fire promoting elements in a smoke barrier system.

The splinter binding smoke barrier system includes a splinter binding foil with an adhesive and a glass pane. The smoke barrier system further includes a fixation element. As mentioned above the adhesive is arranged between the splinter binding foil layer and the glass pane. In other words: The adhesive of the splinter binding foil is arranged next to respectively adjacent to the glass. The splinter binding foil is equipped to hold glass fragments of a glass pane together in case of a glass breakage. Moreover, the splinter binding foil is arranged between the fixation element and the glass pane. In particular the splinter binding foil can be clamped between the fixation element and the glass pane.

The splinter binding foil is designed to detach from the glass pane in the case of fire and/or temperature influence. The splinter binding foil can be weight bearing, in particular the splinter binding foil can be equipped to bear the weight of the glass pane. In particular the splinter binding foil can bear the weight of the fragments of the broken glass pane.

Furthermore, the glass pane can include an opening, and the splinter binding foil can include a foil opening. The foil opening can be arrangable on top of the glass pane. The foil opening can be arranged corresponding to the opening of the glass pane. As mentioned above the adhesive can be arranged between the glass pane and the splinter binding foil, enabling the cold state binding of the glass pane and eventual splinter to the foil.

The splinter binding foil can be clamped against the glass pane adjacent to the openings (pane opening and foil opening). This enables to compensate for the weakening of the splinter binding foil in close vicinity of the foil opening.

The splinter binding foil should be essentially intact for providing the splinter binding and/or weight bearing properties. A corruption of the splinter binding foil can impair the binding and weight bearing of the foil and therefore the protection of the fragments from falling down in case of a glass breakage. In contrast to that, the foil opening represents a damage of the foil. The sustained weakening of the splinter binding foil due to the foil opening can be compensated by exerting a clamping force adjacent to the foil opening. The clamping force can provide a stabilisation of the foil opening and the glass pane in the region of the weakening. Such a stabilisation can provide an improvement of the smoke barrier system and its properties in the cold state and the event of fire and/or temperature influence. The surprising stabilisation of the weakening is developed by the inventors.

The glass pane includes two substantially parallel major surface areas, the major surface areas are also called flat sides. The edges of the two flat sides are connected to each other via an end side. The end side has a smaller surface area than the flat sides and the dimension of the end side corresponds to the thickness of the glass pane. In this text the term 'end face' is used for the circumferential area between the two flat sides, which is also called "edge" or "narrow side" of a glass pane, or a surface thereof. An edge region of the glass pane, which may be arranged close respectively closest to the supporting construction can be also referred to as fixation region. The edge region extends not only via the end face of the glass pane but also spreads over a region of the flat side adjacent to the end side.

The opening of the glass pane, also called pane opening, can be arranged in the edge region of the glass pane. The opening can reach from one flat side of the glass pane to the opposite flat side of the glass pane.

The opening can enable a stable connection between the fixation element and the glass pane as the fixation element can have a minimised dimension extending between a supporting construction and the glass pane. The smoke barrier system can be installed on a supporting construction.

In this text the smoke barrier system is a device to channel, contain and/or prevent the migration of smoke (fire effluent). The smoke barrier system can also be called Smoke Curtains, Smoke Blinds and/or Smoke Screens. The smoke barrier system can build a smoke reservoir. The smoke reservoir is a region within the supporting construction limited or bordered by the smoke barrier system and/or structural elements of the supporting construction so as to retain a thermally buoyant smoke layer in the event of a fire.

The glass pane can include glass. The glass pane, in particular the flat glass pane, in most cases can be considered as transparent glass pane. The glass pane can also be a ceramic glass, in particular a vitroceramic. The glass pane can be a special bent glass pane. Thermally or possibly chemically prestressed glass can be particularly favourable. A transparent glass pane can be based on polymer (e.g. from polycarbonates or polymethyl methacrylate (PMMA; acrylic glass), partially crystalline glass (ceramic glass) or composite systems with glass elements and plastic carriers, are also considered as alternatives to glass based on silicon oxide. The glass pane can also include glass on a borosilicate basis. In other words: The glass pane, in particular a transparent and/or translucent glass pane, can include a silicon based glass, a borosilicate, vitroceramic, a polymer based pane and/or other types of glass.

The pane can include fire resistant respectively temperature resistant properties. The pane can be a fire-resistant glazing. The term "fire-resistant glazing" has a functional meaning and is not to be understood as being limited to certain materials (specifically: glass in the narrow context), but expressly also includes constructions with transparent or translucent panes of the above mentioned and other materials.

Furthermore, the glass pane can be the temperature resistant glass pane. The smoke barrier system can be classified at least as a DH or D smoke barrier according to EN 12101-1:2005+A1:2006. In other words: The smoke barrier system can be a fire-rated smoke barrier system. The fire-rated smoke barrier system is characterized by a fire resistance duration, respectively fire resistant rating. EN 12101-1:2005+A1:2006 established a standard for testing and classifying smoke barriers.

The temperature resistance or fire resistance can be considered as the ability of a smoke barrier system to form an effective barrier against the spread of flames, smoke and/or hot gas. A temperature resistance can be defined as the minimum number of minutes during which the smoke barrier system in the examination meets the criteria of the standardized examination procedure with defined boundary conditions (EN 12101-1:2005+A1:2006). Accordingly, the temperature resistance can be determined under a certain temperature stress. EN 12101-1:2005+A1:2006 requires an exposure of the smoke barrier system to a heat respectively temperature influence of 600° C. for the classification as a D smoke barrier system, sometimes also called $D_{600}$. Higher temperature according to a standard heat curve (EN 1363-1:2012) are required for classification as DH smoke barrier system. Furthermore, it is required that the DH and D smoke barrier system do not release flaming droplets or particles within the first ten minutes of the standard test. The period within which the tested smoke barrier system meets requirements of EN 12101-1:2005+A1:2006, permits the timely classification of the smoke barrier system. In other words: The classification of the smoke barrier system is a temperature-time classification. The standard classification is a D-class according to which the smoke barrier is exposed to a heat of 600° C. An advanced smoke barrier system of the DH-class is exposed to a standard heat curve, e.g. defined in EN1363-1. Furthermore, according to both classifications the smoke barrier system does not release flaming droplets or particles in the first ten minutes of the classification test.

Classification periods are indicated for each classification in minutes, wherein the classifying times: 30, 60, 90, 120, or longer are to be used. The temperature resistance period respectively fire resistance period is thus defined by at least 30 minutes. In general, a temperature resistant smoke barrier system thus fulfils for at least 30 minutes the appropriate criteria or requirements for temperature resistance. The minimum criterion is the physical barrier. A temperature smoke barrier system must therefore be classified at least as D30. Fire rated smoke barrier systems have to withstand the temperature of the standard heat curve and are classified as at least DH 30 smoke barrier system if fulfilling the corresponding requirements for at least 30 minutes. Accordingly, the fire rated smoke barrier system must therefore be classified at least as DH 30.

Furthermore, the smoke barrier system can also comply with various fire ratings, not only the standardized rating according to EN 12101-1. For example a fire adviser can demand specified fire rating minimum requirement (temperature and resistance time) for a fire rated smoke barrier system. The minimum requirements can be lower than the standardised requirements for a fire rated smoke barrier system. The smoke barrier system can be a fire rated smoke barrier system.

The smoke barrier system can be a static smoke barrier system. The static smoke barrier system does not require additional power supply and is constantly operational. The static smoke barrier is permanently fixed in its fire operational position.

In general, smoke barriers can be categorised in the following categories: static smoke barrier with flexible material or rigid material and active smoke barrier with flexible material or rigid material. Static smoke barriers can be fixed in their fire operational position at all times and according to their classification (as described above). Static smoke barrier systems can be used as alternatives and/or additional to the elements of the supporting constructions which could act as permanent static smoke barriers.

The adhesive can include a lower softening point than the splinter binding foil respectively the foil layer. This allows for a loosening of the adhesive without impacting the splinter binding foil. Furthermore, the softening of the adhesive can improve the detachment of the splinter binding foil from the glass pane in the case of fire and/or temperature influence.

Furthermore, the adhesive can be equipped for separation of the splinter binding foil and/or the glass pane at elevated temperature. In this text elevated temperature is temperature above room temperature, in particular above 50° C., in particular 100° C. The elevated temperature can be similar to the temperature influence and originate from a fire and/or hot air and/or hot gas. For example, the adhesive could promote the separation by a temperature dependence of the adhesion. It is also possible that the adhesive deteriorates and/or decomposes upon exposure to elevated temperature.

The adhesive can be designed to soften before the splinter binding foil starts burning in the event of fire and/or temperature influence. This can improve the detachment of the splinter binding foil from the glass pane and inhibiting the formation of flaming droplets, as the softening of the adhesive can induce the detachment and the splinter binding foil drops down before starting to burn.

The adhesive can be designed as a layer essentially covering the foil layer. Such an essentially all-over adhesion can improve the bonding between the glass pane and the splinter binding foil. The adhesive can be arranged as a rather thin layer (couple of micrometre), such a thin adhesive layer can improve the detaching.

The glass pane can include a coating and/or a treated surface. The coating respectively treated surface, in particular the surface of a flat side of the glass pane, can be arranged adjacent to the splinter binding foil respectively to the adhesive.

The splinter binding foil can include a plastic material, respectively a polymer, in particular polyethylene terephthalate (PET). The PET-foil can be a 3M® Safety & Security of the ULTRA Series (dated 2009), for example a 3M® Safety & Security Film ULTRA S600.

The splinter binding foil can extend essentially across a flat side of the glass pane. In particular the splinter binding foil can extend essentially continuously across essentially the whole flat side of the glass pane. The splinter binding foil can be arranged on one flat side of the glass pane. The splinter binding foil can be arranged adjacent to only one glass pane. It is possible that the splinter binding foil is no composite glazing interlayer —meaning that the splinter binding foil is not arranged between two glass panes. This does not exclude that the glass pane is a composite glazing. The glass pane can be a monolithic glass pane, in contrast to a composite glazing the monolithic glass pane is significantly lighter. Furthermore, less fragments are produced by one glass pane compared to a laminated glazing with two or more panes. Accordingly, less fragments have to be secured and hold by the splinter binding foil.

The splinter binding foil is arranged on at least one flat side of the glass pane, in particular on the flat side of the glass pane facing away from the fire and/or temperature influence. This improves the detaching and falling down without formation of flaming droplets.

In contrast to that, the splinter binding foil can be arranged on the opposite flat side facing towards the fire and/or temperature influence. In the case of fire and/or temperature influence the adhesive can decompose, soften, melt and/or rapidly reduce its adhesion so the splinter binding foil drops before the splinter binding foil starts to burn and/or self-ignites.

The splinter binding foil can also be arranged on both flat sides of the glass pane. In such a symmetric smoke barrier system the securing of fragments from a glass breakage can be improved.

As described above the glass pane can include an opening (also called pane opening), and the splinter binding foil can also include a foil opening. The foil opening can be arrangable corresponding to opening of the glass pane. In particular an inner cross section of the foil opening can essentially correspond to an inner cross section of the pane opening. The smoke barrier system can further include a fixation element. The fixation element can be equipped to be fixed to a supporting construction, on/in which the smoke barrier system is to be installed. In particular, the smoke barrier system is installed to the supporting construction, i.e., the ceiling of a building respectively room. The fixation element can equipped to fasten the fixation element to the opening of the glass pane, wherein the splinter binding foil is clamped between the glass pane and the fixation element. The clamping can be effective without fire and/or temperature influence. In the case of fire and/or temperature influence the splinter binding foil can tear respectively rupture close to the opening, resulting in a detachment from the glass pane without the creation of burning droplets.

Additionally to the opening, the glass pane can also include shapes and cutouts. Those shapes and cutouts can be correspondingly arranged respectively designed on the splinter binding foil.

The fixation element can include a bracket and fastening means. The bracket can be equipped to be fixed to a supporting construction. The fastening means can be equipped to fasten the bracket to the glass pane via an opening.

Furthermore, the splinter binding foil can be clamped between the bracket and the glass pane and/or between the fastening means and the glass pane, depending on the arrangement of the splinter binding foil.

The fastening means are equipped to pass through the opening of the glass pane and the foil opening. In particular, the fastening means can be equipped to fasten the glass pane against the bracket. The fastening can be accomplished by a pressing of the glass pane against the bracket. The corresponding pressing force can be exerted to a portion of the glass pane adjacent to the pane opening. This can improve the weight bearing properties of the splinter binding foil.

The fastening means can include a bolt, a nut and/or a clamping plate. The fastening means can clamp the pane to the bracket. For example in case the fastening means are designed as a bolt, a washer can be arranged under the head of the nut or bolt, clamping the pane and the splinter binding foil to the bracket.

The smoke barrier system, in particular the fastening means, can include a washer. The washer can additionally be used to improve the clamping. The washer can be arranged between the bracket and/or fastening means and the splinter binding foil to press the splinter binding foil against the glass pane. The washer can be an intumescent washer to increase the pressure in case of a fire and/or temperature influence. The intumescent washer expands under thermal influence of a fire and/or hot gas.

The smoke barrier system can include at least two essentially separate fixation elements respectively at least two brackets. The glass pane can include at least two openings. The fixation element respectively the fastening means can be designed to fasten a first bracket to a first opening of the pane and a second bracket can be fastened to a second opening, and so on. This allows for a precise and stable fastening of the glass pane with the splinter binding foil relative to the supporting construction. The brackets respectively the fixation elements can be essentially identical. The size and/or positioning of the openings (pane opening and foil opening) can correspond to each other. It is also possible that the positioning and/or size of the openings can determine orientational alignment of the glass pane in the supporting construction. It is possible that the smoke barrier system includes more than two bracket respectively fastening means and corresponding more than two openings, for example at least three, four, five and so on.

The smoke barrier system can include at least two first washers. The washers are arranged close to the first bracket and respectively the second bracket between the fastener means and the glass pane respectively between the fastening means and the splinter binding foil. Additionally, the smoke barrier system can include at least two second washers. The second washers are arranged opposite to the first washers as explained above.

The smoke barrier system can also include two first brackets and two second brackets. The two second brackets can be arranged opposite the corresponding first bracket. This leads to a symmetric fixation of the smoke barrier system to the supporting construction.

The smoke barrier system can include at least two glass panes. Each glass pane can be fixed to the supporting construction by a fixation element and the glass panes are arranged adjacent to each other. The adjacent glass panes build a uniform smoke barrier system. The space between the adjacent glass panes is minimized to allow minor thermal expansion of the glass panes due to a temperature influence and to prevent the passage of fire and/or hot gas.

One glass pane and/or a combination of panes can also follow shapes of construction. This means that they do not need to have the same orientation. They can have different angles with respect to adjacent panes.

The splinter binding foil can be a tough and transparent film, in particular a polyester film. The splinter binding foil can be coated with the adhesive. As mentioned above the strong adhesive prevents glass fragments from dropping from the construction in the event of glass breakage. In other words: If a glass breakage occurs, the strong adhesive keeps the shards tight and together, bond to the splinter binding foil.

The supporting construction can be a connection to the roof respectively the ceiling. The smoke barrier system can be fixed directly to the ceiling respectively roof, wherein the supporting construction can be seen as ceiling respectively roof.

Further preferred embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to exemplary embodiments which are illustrated in the attached drawings, in which are schematically shown.

DETAILED DESCRIPTION OF THE INVENTION

Figure 1:
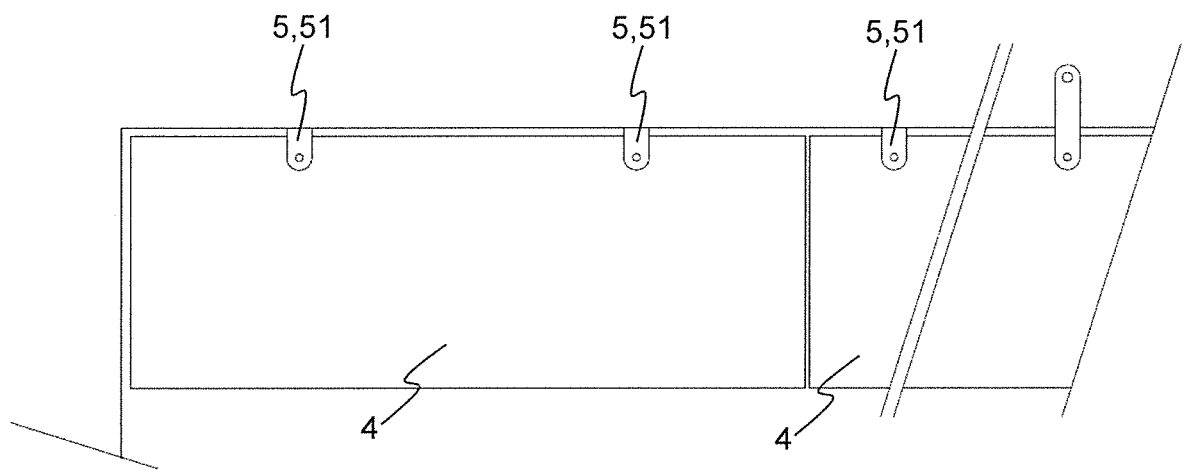
FIG. 1 plan view of the smoke barrier system.

The reference symbols used in the drawings, and their meanings, are listed in summary form in the list of reference symbols. In principle, identical parts are provided with the same reference symbols in the figures.

FIG. 1 shows a plan view of the smoke barrier system, including at least two glass panes 4, wherein each glass pane 4 is fastened to two fixation elements 5, respectively brackets 51. The brackets 5,51 are fixed to the supporting construction. The two glass panes 4 are arranged adjacent to each other. The adjacent glass panes 4 build a uniform smoke barrier system 1. The space between the adjacent glass panes 4 is minimized to allow minor thermal expansion of the glass panes 4 due to a temperature influence and to prevent the passage of fire and/or hot air and/or gas.

The glass pane 4 includes a splinter binding foil 2 which is adhered with an adhesive 3 to one flat side of the glass pane 4. The adhesive is part of the splinter binding foil. The splinter binding foil includes a foil layer and the adhesive.

Figure 2:
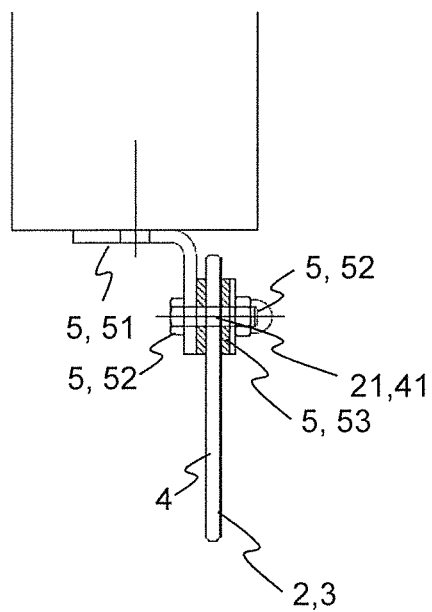
FIG. 2 sectional drawing of a smoke barrier system.

FIG. 2 shows a sectional drawing of a smoke barrier system 1 with a splinter binding foil 2 and an adhesive 3 as well as a glass pane 4. The glass pane 4 and the splinter binding foil 2 include corresponding openings 21,41. The splinter binding foil 2 is adhered to the glass pane 4, wherein the splinter binding foil 2 is clamped between the glass pane 4 and a fixation element 5. The fixation element 5 includes a bracket 51, a fastening mean 52 and a washer 53. The bracket 51 is equipped to be fixed with respect to the supporting construction, in particular to the ceiling. The fastening mean 52 is equipped to fasten the glass pane 4 with respect to the bracket 51 and clamps the splinter binding foil 2. The washer 53 can additionally be used to improve the clamping. The washer 53 is arranged between the bracket 51 and/or fastening means 52 and the splinter binding foil 2 to press the splinter binding foil 2 against the glass pane 4. The washer 53 can be an intumescent washer 53 to increase the pressure in case of a fire and/or temperature influence.

While the invention has been described in present preferred embodiments of the invention, it is distinctly understood that the invention is not limited there to, but may be otherwise variously embodied and practised within the scope of the claims.

The invention claimed is:

1. A smoke barrier comprising a splinter binding and weight bearing foil and a glass pane, the smoke barrier being adapted for use in a smoke barrier system, the smoke barrier system comprising a fixation element,
    wherein the splinter binding and weight bearing foil comprises a foil layer and an adhesive;
    wherein the adhesive is arranged next to the glass pane and adheres the foil layer to the glass pane,
    wherein the splinter binding and weight bearing foil is equipped to hold glass fragments of the glass pane together in case of a breakage of the glass pane,
    wherein the splinter binding and weight bearing foil is arranged between the fixation element and the glass pane,
    wherein the splinter binding and weight bearing foil is designed to detach from the glass pane in the case of a fire and/or a temperature influence, without creating any burning droplets;
    wherein the smoke barrier system is a fire-rated smoke barrier system that is classified at least as a D 30 and/or DH 30 smoke barrier according to EN 12101-1:2005+A1:2006;
    wherein the glass pane comprises an opening;
    wherein the splinter binding and weight bearing foil comprises a foil opening;
    wherein the foil opening is arranged to correspond to a location of the opening of the glass pane; and
    wherein the fixation element is equipped to fasten to the opening of the glass pane.

2. The smoke barrier according to claim 1, wherein the adhesive has a lower softening point than the foil layer.

3. The smoke barrier according to claim 1, wherein the adhesive is equipped for separation of the splinter binding foil from the glass pane at an elevated temperature.

4. The smoke barrier according to claim 1, wherein the adhesive is designed to soften before the splinter binding and weight bearing foil starts burning in the event of the fire and/or the temperature influence.

5. The smoke barrier according to claim 1, wherein the adhesive is designed as a layer essentially covering the foil layer.

6. The smoke barrier according to claim 1, wherein the splinter binding and weight bearing foil comprises a polymer.

7. The smoke barrier according to claim 1, wherein at least one of the following conditions is fulfilled:
    the splinter binding and weight bearing foil extends essentially across a flat side of the glass pane; and
    the splinter binding and weight bearing foil is arranged on a flat side of the glass pane facing away from the fire and/or the temperature influence.

8. The smoke barrier according to claim 1,
    wherein the fixation element is equipped to be fixed to a supporting construction, and
    wherein the splinter binding and weight bearing foil is clamped between the glass pane and the fixation element.

9. A splinter binding smoke barrier system, comprising a splinter binding foil, a glass pane, and a fixation element, the splinter binding foil comprising a foil layer and an adhesive;
    wherein the adhesive is arranged next to the glass pane and adheres the foil layer to the glass pane,
    wherein the splinter binding foil is equipped to hold glass fragments of the glass pane together in case of a breakage of the glass pane,
    wherein the splinter binding foil is arranged between the fixation element and the glass pane,
    wherein the splinter binding foil is designed to detach from the glass pane in the case of a fire and/or a temperature influence, without creating any burning droplets,
    wherein the splinter binding smoke barrier system is a fire-rated smoke barrier system that is classified at least as a D 30 and/or DH 30 smoke barrier according to EN 12101-1:2005+A1:2006,
    wherein the glass pane comprises an opening,
    wherein the splinter binding and weight bearing foil comprises a foil opening,
    wherein the foil opening is arranged to correspond to a location of the opening of the glass pane, and
    wherein the fixation element is equipped to fasten to the opening of the glass pane.

10. The smoke barrier system according to claim 9, wherein the splinter binding foil is arranged on top of the glass pane.

11. The smoke barrier system according to claim 9,
wherein the fixation element comprises a bracket and fastening means,
wherein the bracket is equipped to be fixed to a supporting construction, and
wherein the fastening means is equipped to fasten the bracket to the glass pane via the opening of the glass pane.

12. The smoke barrier system according to claim 11, wherein the fastening means is equipped to pass through the opening of the glass pane and the foil opening.

13. The smoke barrier system according to claim 9, wherein at least one of the following conditions is fulfilled:
the adhesive has a lower softening point than the foil layer,
the adhesive is equipped for separation of the splinter binding foil from the glass pane at an elevated temperature,
the adhesive is designed to soften before the splinter binding foil starts burning in the event of the fire and/or the temperature influence, and
the adhesive is designed as a layer essentially covering the foil layer.

14. The smoke barrier system according to claim 9, wherein at least one of the following conditions is fulfilled:
the foil layer comprises polymer,
the splinter binding foil extends essentially across a flat side of the glass pane, and
the splinter binding foil is arranged on a flat side of the glass pane facing away from the fire and/or the temperature influence.

* * * * *